United States Patent [19]

Martin

[11] 4,234,074
[45] Nov. 18, 1980

[54] APPARATUS FOR SEPARATING METAL CUTTINGS FROM LIQUID COOLANTS

[75] Inventor: William F. Martin, Tulsa, Okla.

[73] Assignee: James A. Herring, Tulsa, Okla. ; a part interest

[21] Appl. No.: 920,658

[22] Filed: Jun. 30, 1978

[51] Int. Cl.³ .................... B65G 33/14; B03C 1/30
[52] U.S. Cl. ............................. 198/558; 198/662; 198/670; 198/690; 198/861; 210/222
[58] Field of Search ........ 198/657, 662, 666, 669–675, 198/690, 558, 616, 861, 855, 856; 210/222, 223, 298, 523, 525, 532 R

[56] References Cited

U.S. PATENT DOCUMENTS

| | | | |
|---|---|---|---|
| 1,108,944 | 9/1914 | Tannenbaum | 198/558 X |
| 1,856,573 | 5/1932 | Lower | 198/861 |
| 1,946,776 | 2/1934 | Burton | 198/657 X |
| 2,136,775 | 11/1938 | Myers | 198/666 X |
| 2,499,929 | 3/1950 | Nelson et al. | 198/670 |
| 2,656,036 | 10/1953 | Whitney | 198/861 |
| 3,121,683 | 2/1964 | Fowler | 210/223 |
| 3,223,227 | 12/1965 | Dudte | 198/671 X |
| 3,360,824 | 1/1968 | Schippers | 198/669 X |
| 3,402,820 | 9/1968 | Lohmann | 210/222 |
| 4,030,593 | 6/1977 | Deboffles | 198/861 X |

Primary Examiner—James L. Rowland
Attorney, Agent, or Firm—Head & Johnson

[57] ABSTRACT

An apparatus for conveying solids from a lower to a higher elevation, such as metal cuttings from machine coolants, including a horizontal auger rotatably mounted in the semi-circular bottom of an open top hopper, one end of the hopper being open, an inclined auger rotatably mounted in a semi-circular bottomed inclined housing, the lower end of the housing communicating with the open end of the hopper, and the lower end of the inclined auger being below the hopper, the housing having a discharge chute at the upper end, liquids and solids inter-mixed being deposited into the opened top of the hopper to permit the liquids to overflow the hopper while the rotating horizontal auger moves solids onto the inclined auger which moves the solids upwardly within the housing, allowing the liquid to be drained therefrom and back into the hopper, the solids being discharged out the outlet chute and the liquids permitted to be returned for reuse or disposal.

8 Claims, 10 Drawing Figures

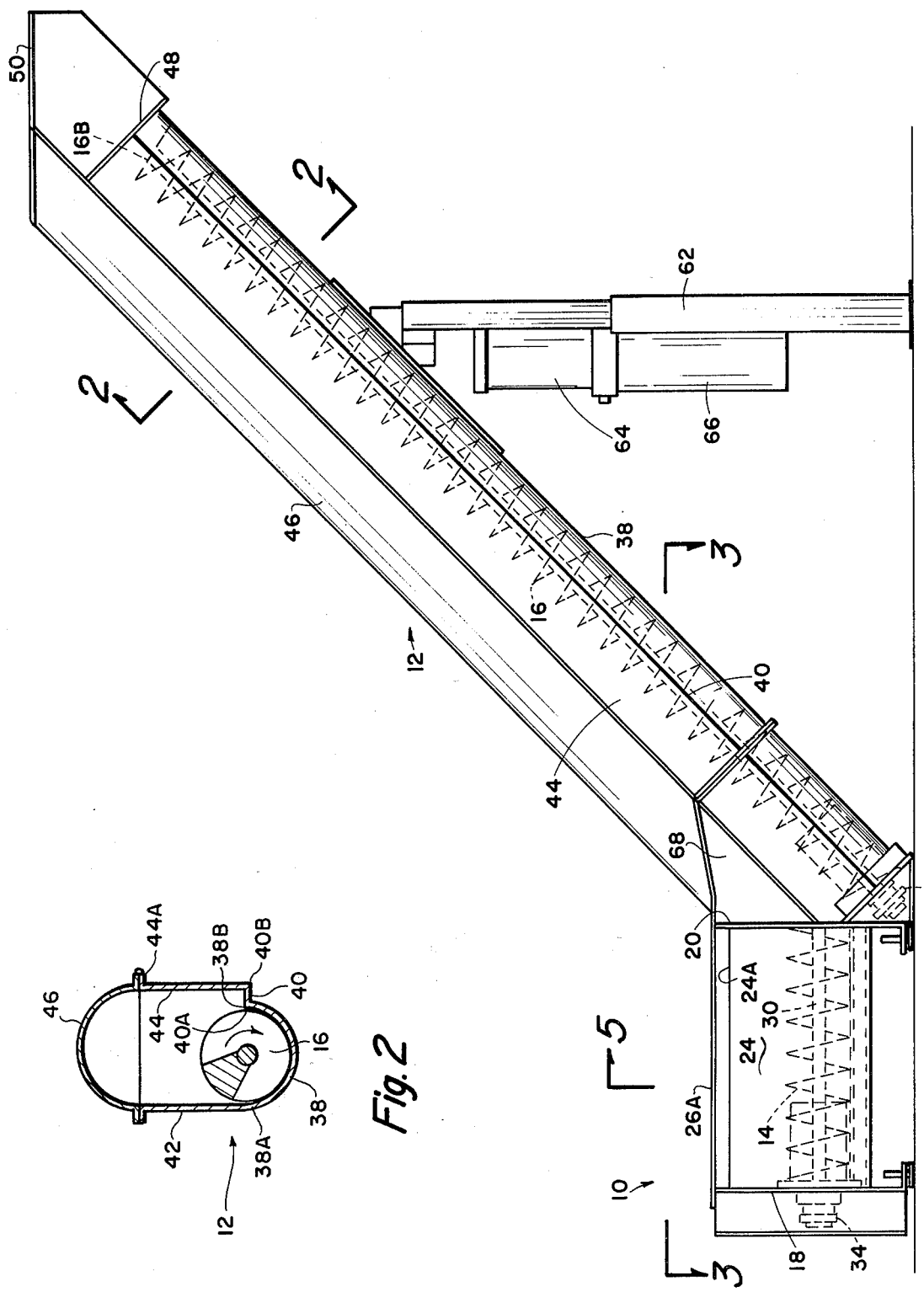

APPARATUS FOR SEPARATING METAL CUTTINGS FROM LIQUID COOLANTS

BACKGROUND AND OBJECTS OF THE INVENTION

This invention is directed towards improvements in a device to convey solid objects from a lower to a higher elevation, such as for separating solids from liquids and is particularly directed to an apparatus useful for separating cuttings and chips from machine coolant. In the operation of latches, milling machines, and other metal working tools, liquid coolants are utilized to cool and lubricate the tools and the metal parts being worked. The coolant also serves to flush away and carry with it chips and cuttings. In order to recirculate the coolant, it is important that the chips and cuttings be separated from the coolant. Prior devices for achieving this result are exemplified in U.S. Pat. No. 3,402,820, issued to E. P. Lohmann on Sept. 24, 1968 entitled "Magnetic Cleaner for Coolant," and U.S. Pat. No. 4,052,311, issued Oct. 4, 1977 to William F. Martin, entitled "Apparatus for Separating Solids from Liquids." These patents describe the use of rotating augers for moving solid objects, such as cuttings and chips, up an inclined auger. The auger functions to move the solid objects out of liquid in which they are carried and up an inclined housing wherein the liquid is drained from the objects. At the upper end of the housing is a solids discharge opening. The liquid passing into the device is allowed to overflow and is returned for further use.

The present invention is directed towards improvements in the device such as shown in U.S. Pat. No. 4,052,311. Particularly, the present invention is directed towards an arrangement for providing a low profile separator in which the hopper receiving the co-mingled liquid and solid particles may be of a reduced height. In addition, the present invention provides an improved means of using a low elevation hopper for transmitting solids from a liquid medium onto the lower end of an inclined auger for thereafter moving the solids above the level of the liquid medium by the inclined auger to allow liquid to drain from the solids and for discharge of the solids for collection.

It is therefore an object of this invention to provide an improved apparatus for conveying solid objects from a lower to a higher elevation.

More particularly, an object of this invention is to provide equipment for separating solids from liquid, such as cuttings from machine coolant, including a low-profile hopper having a horizontal auger therein and an inclined auger, the lower end of the inclined auger being below the horizontal auger whereby solids are passed from the hopper onto the lower end of the inclined auger and moved upwardly to allow liquid to drain therefrom, the solids being deposited out the upper end of the inclined auger for collection.

Another object of this invention is to provide an improved housing configuration for an inclined auger which minimizes the possibility of metal objects jamming as they are moved upwardly out of the liquid medium and discharged for collection.

Another object of this invention is to provide an improved hydraulic control system for an apparatus for separating metal cuttings from liquid coolants with a cover interlock to afford improved safety to operators and facilitate clearing the machine if it becomes jammed.

These general objects as well as other and more specific objects of the invention will be fulfilled in the following description and claims, taken in conjunction with the attached drawings.

DESCRIPTION OF VIEWS

FIG. 1 is an elevational side view of an apparatus embodying this invention which is particularly adaptable for separating cuttings from machine coolants.

FIG. 2 is a cross-sectional view taken along the line 2—2 of FIG. 1 showing the inclined housing and inclined auger in cross-sectional arrangement and showing the provision of the anti-jam ledge of the housing.

SUMMARY OF THE INVENTION

Figure 3:
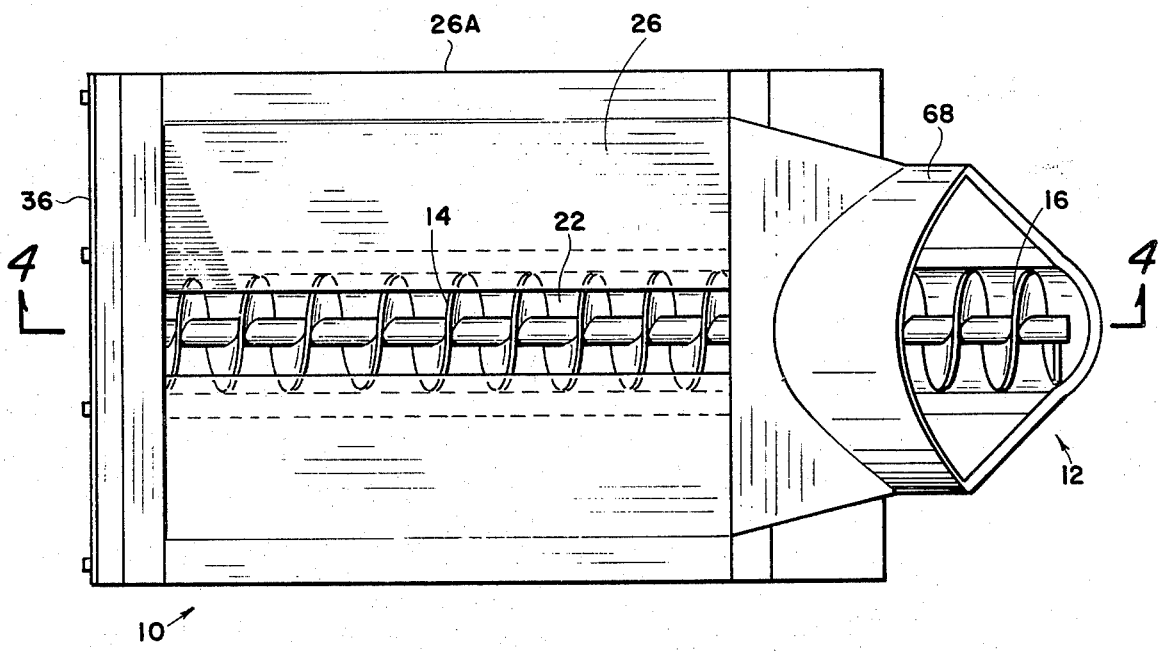
FIG. 3 is a cross-sectional view taken along the line 3—3 of FIG. 1, looking downwardly into the upper open top of the hopper and showing the lower portion of the inclined housing in cross-section.

An apparatus is described for conveying solid objects from a lower to a higher elevation, including a horizontal hopper with a horizontal auger rotatably mounted therein, the hopper having a semi-circular bottom receiving the horizontal auger and being open at one end. An inclined housing also has a semi-circular bottom, and the inclined housing has an auger mounted therein, the lower end of the inclined auger being below the horizontal auger whereby solids are passed out of the hopper onto the lower end of the inclined auger and carried upwardly. The solid elements are carried by the inclined auger for discharge out the upper end for collection. The arrangement of the device permits a lower profile hopper which receives the solid materials therein. Further, the inclined housing is defined in cross-section to provide an anti-jam ledge which reduces the possibility of physical objects being jammed between the outer periphery of the auger and the interior surface of the housing.

In addition, an improved hydraulic control system is provided which cooperates with the inclined auger cover to provide improved safety to operators and a means for reversing the augers to correct a jam should it occur.

DETAILED DESCRIPTION OF THE PREFERRED EMBODIMENT

Referring first to FIG. 1, the device of this invention is illustrated in an embodiment particularly adaptable for separating chips and cuttings from machine coolant. The device includes two basic portions; that is, a horizontal hopper generally indicated by the numeral 10, and an inclined housing generally indicated by the numeral 12. Supported in the hopper 10 is a horizontal auger 14 and supported in the inclined housing is an inclined auger 16.

Figure 5:
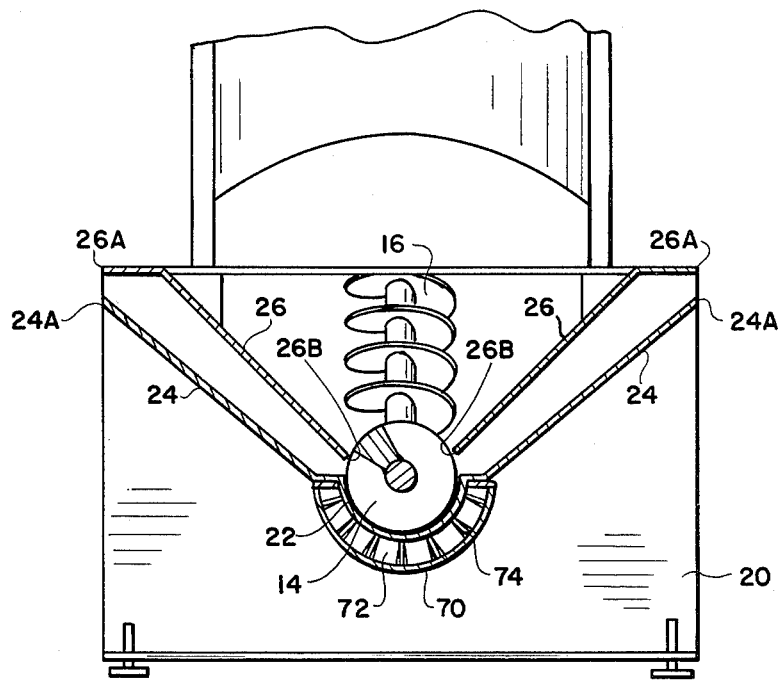
FIG. 5 is a cross-sectional view taken along the line 5—5 of FIG. 1 showing the hopper portion of the device in cross-section.

The horizontal hopper 10 includes an inner end plate 18 and an outer end plate 20. As shown in FIG. 5, the hopper has a semi-circular bottom 22 and inclined sides 24 which taper outwardly and upwardly. Positioned between end pieces 18 and 20 and above the hopper sidewall 24, are baffles 26. The upper ends 26A of the baffles terminate above the upper ends 24A of the hopper sidewalls providing a fluid overflow space therebetween. The baffle lower edges 26B extend down to adjacent the outer periphery of horizontal auger 14. Combined solids and liquids, such as a coolant carrying cuttings from a lathe, are deposited into the upper end of the hopper. Baffles 26 direct the liquid and solids down into the rotating horizontal auger 14. The liquid passes through the auger and back up into the space between the baffle 26 and hopper sidewalls 24. The liquid overflows out the top edges 24A of the sidewalls and is collected in a vessel (not shown) in which the hopper is positioned. Thus the liquid is permitted to separate out while depositing the solid components directly into the horizontal auger 14.

Figure 4:
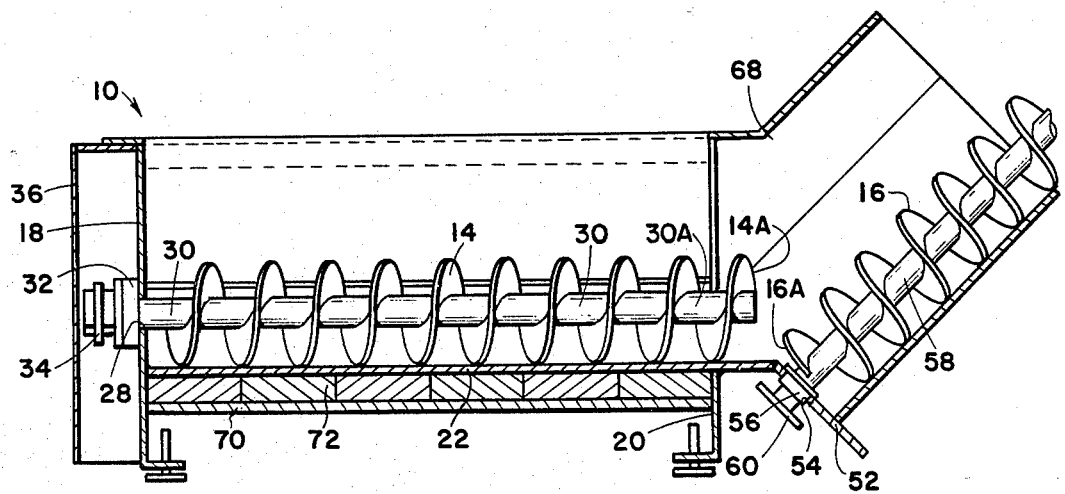
FIG. 4 is a cross-sectional view taken along the line 4—4 of FIG. 3 showing more details of the arrangement of the horizontal auger and the lower end of the inclined auger and showing the arrangement of magnets as used in one embodiment of the invention.

The inner end 18 of the hopper includes an opening 28 (see FIG. 4). Horizontal auger 14 has a shaft which extends seatably through opening 28 and is supported at the inner end by a bearing 32. On the inner end of shaft 30 is a sprocket 34 by which the horizontal auger 14 is rotated. A safety covering 36 is attached to the end plate 18 to cover sprocket 34. As further shown in FIG. 4, the outer end 14A of the horizontal auger is free floating; that is, it is supported by the interior surface of the hopper semi-circular bottom 22. The hopper outer end 20 is fully opened so that solid materials moved by rotating horizontal auger 14 pass freely beyond the outer end of the hopper.

The cross-sectional configuration of the inclined housing 12 is illustrated in FIG. 2. The housing includes a semi-circular bottom 38, the interior surface of which is of a diameter slightly larger than the external diameter of the inclined auger 16. The semi-circular bottom 38 has upper edges 38A and 38B. Extending vertically from the upper edge 38A is a first vertical sidewall 42. Attached to the upper edge 38B is a horizontal ledge 40. In the illustrated arrangement the horizontal ledge 40 has an inner edge 40A which attaches to the edge 38B semi-circular bottom. Attached to the horizontal ledge outer edge 40B is a second vertical sidewall 44. Thus the vertical sidewalls 42 and 44 are spaced apart from each other and at a distance apart equal to the diameter of the semi-circular bottom portion 38 plus the width of horizontal ledge 40. While the inclined housing 12 has been described as being formed of four portions; that is, a semi-circular bottom, a horizontal ledge, and two vertical sidewalls, in practice the inclined housing may be shaped of a single piece of sheet metal, or it may be configured of two, three, or four portions welded or bolted together as desired. Stating that the housing is of separate elements is for purposes of describing it in detail rather than suggesting the manner in which the housing should be manufactured.

The horizontal ledge 40 functions as an "anti-jam" ledge. The direction of rotation of auger 16 is in the direction of ledge 40 as illustrated by the arrow in FIG. 2. Ledge 40 eliminates the wedge configuration which exists if the sidewall 44 extended vertically from the upper edge 38B of semi-circular bottom portion 38. It can be seen that if auger 16 rotated in the direction opposite the arrow in FIG. 2, any object engaged by the periphery of the auger would tend to be wedged against sidewall 42. By providing the anti-jam ledge 40, this wedging configuration is eliminated with the result that the machine has greatly improved performance. Horizontal ledge 40 is preferably even with or slightly below a horizontal plane taken through the axis of shaft 58 (when the shaft is viewed in cross-section as in FIGS. 2 and 6).

Pivoted to the upper edge 44A of one of the sidewalls is a cover 46. The purpose of the cover is to add security by preventing an operator from getting his hands into the rotating inclined auger 16 but, in addition, to provide a confined area in which tangles of turned metal are confined so that "bird's nests" of entangled metal are more effectively moved upwardly in the housing to be discharged at the outer upper end 48. The cover is preferably semi-circular as shown, but it may be flat or of any other cross-sectional configuration.

Surrounding the inclined housing upper end 48 is a discharge chute 50 (see FIG. 1) which serves to direct solid objects passing beyond the outer support end of inclined auger 16 downward for collection in a receptacle (not shown).

Figure 6:
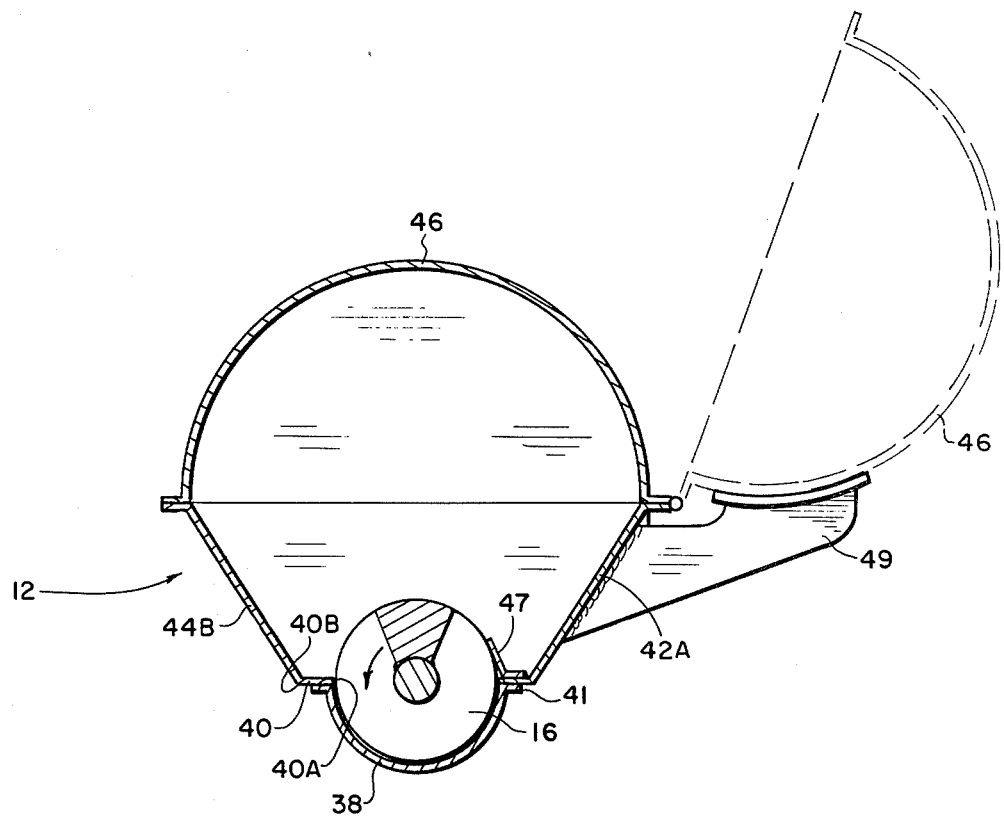
FIG. 6 is a cross-sectional view of the inclined housing and auger as shown in FIG. 2, but showing an alternate design of the inclined housing.

FIG. 6 illustrates an alternate configuration of inclined housing 12. In this arrangement a second horizontal ledge 41 is provided affixed to the other top edge of the semi-circular bottom 38 opposite the anti-jam ledge 40. The housing sidewalls 42A and 44B flare outward from the outer edges of the horizontal ledges. In addition, a wiping bar 47 is supported to horizontal ledge 41. The wiping bar 47 engages the periphery of inclined auger 16. Also illustrated in FIG. 6 is an arm 49 extending from sidewall 42A to support the domed cover 46 when in the opened position.

The alternate arrangement of FIG. 6 provides an enlarged area above auger 16 so that larger bundles of entangled spiraled cuttings, usually referred to as "bird's nests" can be transported up the inclined housing for discharge through chute 50 without severe compaction and the consequent resistance to movement.

As shown in FIG. 4, the lower end of the inclined housing 12 includes a plate 52 having an opening 54 therein. Positioned at the opening is a seal and bearing 56 which rotatably supports the inner end 16A of the inclined auger. The inclined auger has a shaft 58 and the lower end thereof extends through bearing 56 and receives a sprocket 60 by which the auger may be rotated. The upper end 14B of the inclined auger is free floating; that is, the auger is supported only by the interior surface of the semi-circular housing bottom 38. The upper end of auger 16 is unobstructed and unrestricted in the discharge of physical objects which have been transported up the inclined housing, the objects passing out through the housing upper end 48 and discharge chute 50 for collection. It can thus be seen that both the horizontal auger and the inclined auger are open ended and no restriction of any kind is interposed to prevent the discharge of solid objects from the augers. In the case of the horizontal auger 14, the solid objects are discharged onto the lower end of inclined auger 16; and when the objects reach the upper end of auger 16, they are discharged through chute 50.

Augers 14 and 16 may be rotated using any standard prime mover arrangement, including the use of electric motors, hydraulic motors, etc. A preferred arrangement includes the use of separate hydraulic motors (not shown) since hydraulic motors are easily adaptable to speed variations and are small in size and may easily be attached to the device, without interfering with its use. It is desirable, although not mandatory, that the speed of rotation of the augers be adjustable. This is particularly true as to the inclined auger 16. When a large volume of solid material must be handled, then auger 16 must be rotated faster to carry it upwardly and for discharge out the outlet chute 50. On the other hand, when the auger is rotated at a slower rate of speed, more time is provided for fluid to drain from the physical objects, and they arrive at the discharge chute in a drier condition. By providing a variety of speeds, the operator can adjust it to comply with the volume requirements while at the same time maintaining maximum effectiveness of separating the liquids from the physical objects.

As shown in FIG. 1, the inclined housing 12 is supported by a leg structure 62, and this structure may also be used to support ancillary control equipment. When the augers 14 and 16 are driven by hydraulic motors, a hydraulic pump 64 and reservoir 66 may be supported by the leg 62 with hoses extending to the hydraulic motors (not shown).

To connect hopper 10 into the inclined housing 46, a transition bonnet 68 is provided. The purpose of bonnet 68 is to connect the hopper portion to the inclined housng portion in a manner to maintain safety of the device by closing an area wherein a workman might otherwise insert his hands, and particularly, to provide an area wherein the solid components move off of the horizontal conveyor 14 and onto the inclined auger 16 without any restriction or interference and without any obstruction on which the physical objects could lodge.

When the machine is used to separate ferrous metal from liquids, the separation effectiveness is increased by the use of magnets as shown in FIGS. 4 and 5. Provided on the exterior of the semi-circular hopper bottom 22 is a semi-circular magnet housing 70. The axial center magnet housing 70 is coincident with that of semi-circular bottom 22. Positioned between the interior of housing 70 and the exterior of bottom 22 are a plurality of rows of magnets, six rows being shown. Between each adjacent row of magnets is a high permeability divider 74. The magnet housing 70 and dividers 74 are preferably made of soft steel having high magnetic permeability and of a thickness at least seven gauge or greater. The magnets 72 may be shaped as elongated bars but preferably are in pieces of about 1 inch by 1 inch by 3 inches with the magnetic bars being placed end-to-end to reach the total length of the hopper housing between end plates 18 and 20, as shown in FIG. 4.

The polarity of the magnets are arranged such that each magnet has the same polarity upwards; that is, in the direction towards the auger 14. Whether the north pole or south pole of the magnets is positioned in the direction towards auger 14 is not material, but the best results are obtained when the magnets are positioned with the same polarity orientation throughout. This arrangement causes high flux intensities through the dividers 74, and the magnet housing 70, the flux penetrating the hopper semi-circular bottom 22, which is preferably made of low permeability material, such as stainless steel, so that the magnetic lines of flux pass within the interior of the semi-circular hopper bottom. The attraction of magnets 72 substantially reduces the possibility of ferrous pieces being moved upwardly and carried over the top edges 24 of the hopper sidewalls by the fluid flow. In addition, by the attraction of ferromagnetic bits together they form a larger body which is more effectively swept by the rotating auger 14 for deposit into the loswer end of inclined housing 12. When the device is used for separating solids which are not ferromagnetic, the use of magnets 72 does not enhance the effectiveness of the machine, and they may be eliminated.

The shaft 30 of horizontal auger 14 is preferably of ferromagnetic material except for the outer end portion 30A which is of low permeability material. The flight of auger 14 itself is preferably of low permeability material, such as stainless steel. In this way magnet flux is concentrated and distributed by the shaft 30, except for the outer end portion 30A. The importance of providing the outer end portion 30A of low permeability material is so that any ferromagnetic cutting, chips, or parts, such as a lost wrench, bolt, or nut, which may inadvertently get in machine cuttings, does not cling by magnetic attraction to the outer end of the horizontal auger 14 but freely falls off and down onto the inclined auger 16.

Referring to FIGS. 7, 8, 9, and 10, a system is illustrated which improves the safety and performance of the separator. Hydraulic pump 64 driven by motor 76 (see FIGS. 1 and 10) moves fluid from reservoirs 66 through a flow control valve 78 to an auger control valve 80. The auger control valve has three positions. One port of the valve 80 is connected to the source of fluid pressure provided by pump 64, another part is connected to reservoir 66, and the outlet ports connected to a hydraulic motor 82 which drives the horizontal auger 14 and a hydraulic motor 84 which drives the inclined auger 16. A pressure relief valve 86 is set to limit the pressure provided by pump 64 as, for example, at 1,000 psi so that a substantially constant fluid pressure source is applied to control valve 80.

Figure 8:
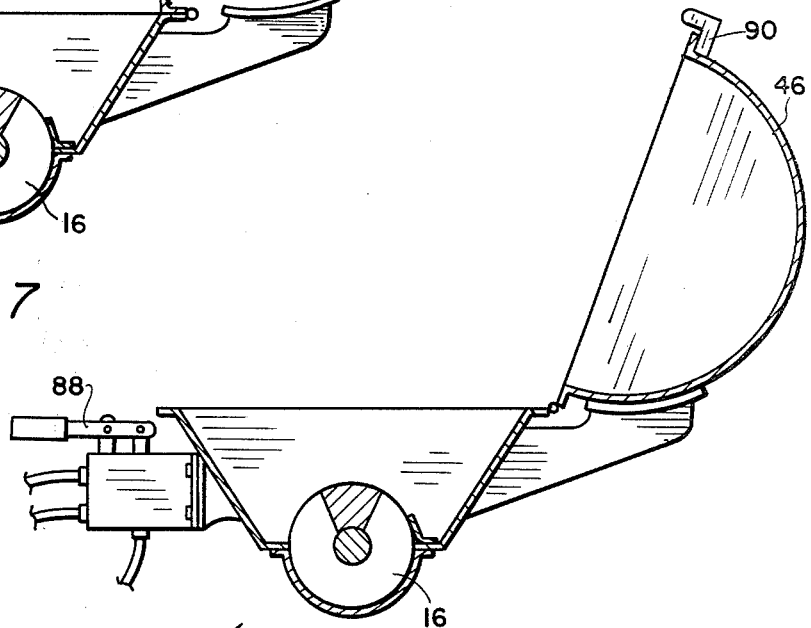
FIG. 8 is a cross-sectional view as in FIG. 7, but showing the cover open and the hydraulic control valve in the neutral position.
Figure 10:
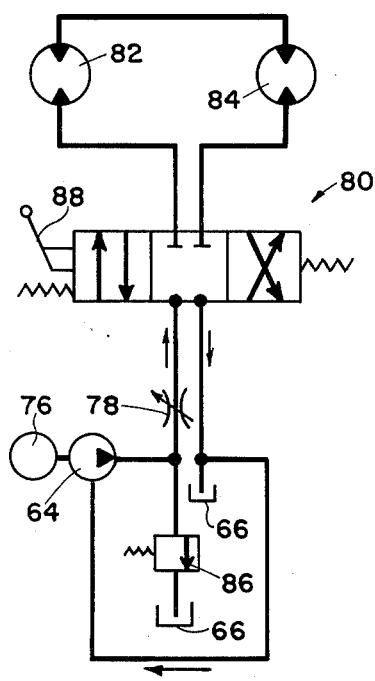
FIG. 10 is a schematic flow diagram of a hydraulic system for operation of the augers and including the three position valve cooperating with the cover in the manner illustrated in FIGS. 7, 8, and 9.

Valve 80 has three positions and is spring loaded to normally return to the center position as illustrated in FIGS. 8 and 10. In the center position, no fluid pressure is directed to either hydraulic motor 82 or 84, and therefore, the augers are not rotated.

Figure 7:
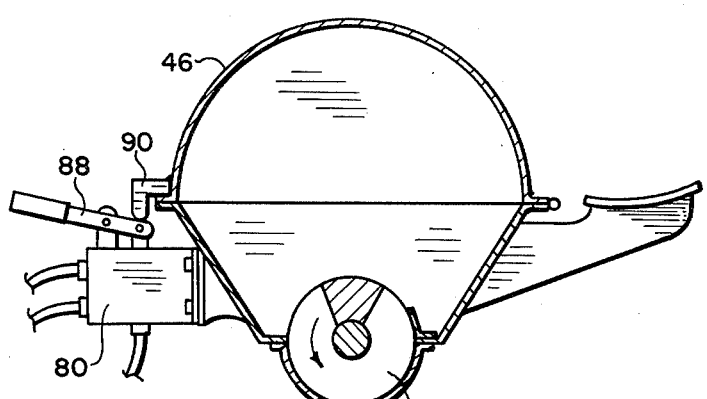
FIG. 7 is a cross-sectional view as in FIG. 6 but showing the use of a hydraulic control valve with a cover interlock feature, and showing the cover closed, and the valve in the forward position.

As shown in FIG. 7, valve 80 is physically affixed to the inclined housing 12 on the exterior thereof and preferably about midway of the length of the housing and at an elevation for comfortable operation by an operator. Valve 80 includes an actuating handle 88 by which the valve can be manually moved from one position to another. The cover 46 of the inclined housing has a boss 90 extending therefrom so that when the cover is in the closed position, boss 90 engages handle 88 and moves the valve to the forward position to direct fluid flow from pump 64 through the hydraulic motors 82 and 84, to rotate the augers in the forward direction, that is, in the direction to move material off horizontal auger 14 and upwardly by the inclined auger 16 for discharge out chute 50. The cover 46 is normally latched in position by latching means, not shown. If the machine becomes jammed, such as by means of a large object being caught or lodged between a portion of the housing and an auger, the operator can inspect the interior of the inclined housing 12 by opening cover 46. When this happens, the boss 90 releases engagement with handle 88, and the valve automatically returns to its central position, stopping all fluid flow to the auger motors 82 and 84, and thereby stopping the augers. In this position the operator can reach into the inclined housing 12 to remove any lodged objects.

Figure 9:
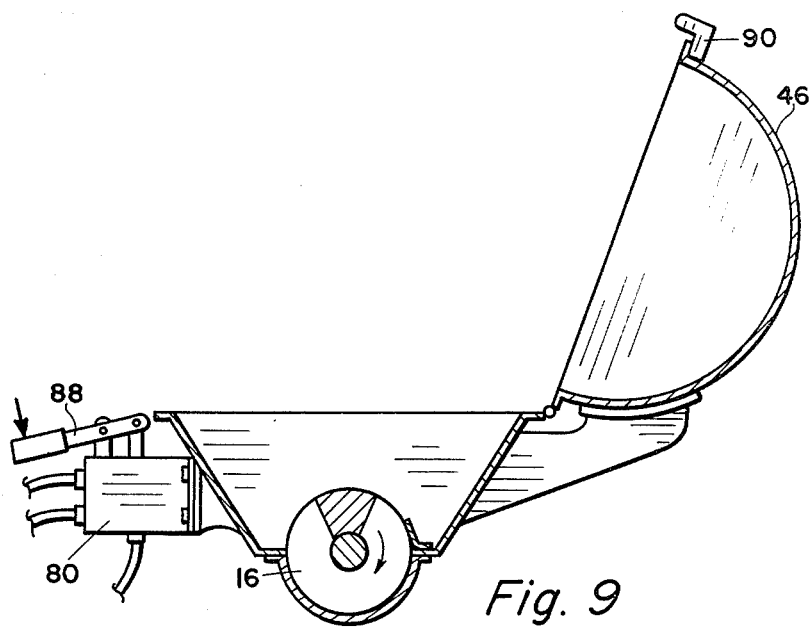
FIG. 9 is a cross-sectional view as in FIG. 8 with the cover open but showing the valve moved to the auger reverse direction as used to unjam the auger.

In the event the object is lodged so tightly that it cannot be easily manually retracted, the operator has the ability, by manipulation of handle 88, to rotate the augers either in the forward or the rearward direction. To move the augers in the forward direction with cover 46 open, the operator lifts up on handle 88, moving it to the position where it would otherwise be with the cover closed. To move the augers in the reverse direction, as shown in FIG. 9, the operator pushes down on the handle 88, and the direction of rotation of the augers is reversed.

This arrangement provides maximum safety of the operator by automatically stopping the machine when the cover 46 is opened, but nevertheless, allows the operator to rotate the augers either in the reverse or the forward direction by manual operation of valve 80.

While the invention has been described in a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. In an apparatus for conveying solid objects from a lower to a higher elevation having an upwardly inclined elongated housing having a solids discharge chute at the upper end and means at the lower end for receiving solid objects and having a rotatable auger in the upwardly inclined housing of external diameter slightly less than the diameter of the housing semi-circular bottom, an improved configuration of the housing whereby entangling solids, such as long machine cuttings, are more efficiently moved upward by the auger for deposit of the solids out through the discharge chute, the improvement comprising:
   the housing being defined in cross-section by a semi-circular bottom of internal diameter slightly greater than the external diameter of said auger, the semi-circular bottom having opposed upper edges;
   a horizontal ledge having one edge affixed to the one of said upper edges of said semi-circular bottom;
   a first sidewall having the lower edge affixed to the other of said upper edges of said semi-circular bottom; and
   a second sidewall having the lower edge affixed to the other edge of said horizontal ledge, the sidewalls being spaced apart, the top of said sidewalls being above said auger providing an area above said auger for moving solids through said housing.

2. An apparatus according to claim 1 including a second horizontal ledge having its inner edge attached to the other upper edge of said semi-circular bottom, and wherein said second sidewall has its bottom edge attached to the outer edge of the second horizontal ledge.

3. An apparatus according to claim 1 including:
   an elongated cover hinged to the upper ends of said housing sidewalls.

4. An apparatus according to claim 2 wherein one edge of said cover is hingedly attached to the upper edge of one of said housing sidewalls.

5. An apparatus according to claim 3 wherein said cover is semi-circular in cross-sectional configuration.

6. An apparatus for conveying solid objects from a lower to a higher elevation, comprising:
   an open top hopper having an inner end and an outer end, the hopper tapering to a semi-cylindrical horizontal bottom, the inner end of the hopper being closed and the outer end being open;
   an upwardly inclined elongated housing having a solids discharge chute adjacent the upper end and an inlet opening adjacent the lower end, the inlet opening communicating with said hopper open end, the housing being defined by:
   (a) a bottom semi-circular in cross-section,
   (b) a horizontal ledge having the inner edge attached to the full length of the upper edge of one side of the semi-circular bottom,
   (c) a first sidewall having the bottom edge attached to the outer edge of the horizontal ledge, and
   (d) a second sidewall extending upward from the other side of said semi-circular bottom, the sidewalls being spaced from each other a distance greater than the diameter of the semi-circular bottom portion, plus the width of the horizontal ledge;
   a horizontal auger having an inner end and outer end rotatably mounted in said hopper, the diameter of the auger being snugly received in said hopper semi-circular bottom, the horizontal auger having a shaft sealably extending from the inner end through said hopper closed end;
   an inclined auger having an inner end and outer end rotatably mounted in said housing, the auger being snugly received in said housing semi-circular bottom, the inclined auger having a shaft extending from one end thereof, the inner end of the inclined auger being below said horizontal auger; and
   means of rotating said horizontal and inclined augers, whereby solids deposited in said hopper are moved by said horizontal auger into the lower end of said inclined housing and onto said inclined auger, the inclined auger moving the solids upwardly in said inclined housing and discharging the solids out said discharge chute, the height of said housing sidewalls being greater than the diameter of said inclined auger providing a solids carrying space above said inclined auger.

7. An apparatus for conveying solid objects from a lower to a higher elevation, comprising:
   an open top hopper having an inner end and an outer end, the hopper tapering to a semi-cylindrical horizontal bottom, the inner end of the hopper being closed and the outer end being open;
   magnet means affixed externally of said hopper semi-circular bottom;
   an upwardly inclined elongated housing having a solids discharge chute adjacent the upper end and an inlet opening adjacent the lower end, the inlet opening communicating with said hopper open end, the bottom of the housing being semi-circular in cross-section;

a horizontal auger having a center shaft and a spiral flight of non-paramagnetic material rotatably mounted in said hopper, the diameter of the spiral flight being snugly received in said hopper semi-circular bottom, the major portion of the center shaft being of paramagnetic material and the outer end being of non-paramagnetic material;

an inclined auger having an inner end and outer end rotatably mounted in said housing, the inclined auger having a shaft extending from one end thereof, the inner end of the inclined auger being below said horizontal auger outer end; and means of rotating said horizontal and inclined augers, whereby solids deposited in said hopper are moved by said horizontal auger into the lower end of said inclined housing and onto said inclined auger, the inclined auger moving the solids upwardly in said inclined housing and discharging the solids out said discharge chute.

8. An apparatus for conveying solid objects from a lower to a higher elevation, comprising:

an open top hopper having an inner end and an outer end, the hopper tapering to a semi-cylindrical horizontal bottom, the inner end of the hopper being closed and the outer end being open;

an upwardly inclined elongated housing having a solids discharge chute adjacent the upper end and an inlet opening adjacent the lower end, the inlet opening communicating with said hopper open end, the bottom of the housing being semi-circular in cross-section;

an elongated cover hinged to said inclined housing;

a horizontal auger rotatably mounted in said hopper, the diameter of the auger being snugly received in said hopper semi-circular bottom;

an inclined auger rotatably mounted in said housing, the auger being snugly received in said housing semi-circular bottom;

means of rotating said horizontal and inclined augers, whereby solids deposited in said hopper are moved by said horizontal auger into the lower end of said inclined housing and onto said inclined auger, the inclined auger moving the solids upwardly in said inclined housing and discharging the solids out said discharge chute;

a source of hydraulic pressure;

hydraulic motor means for rotating said horizontal and inclined augers in the forward or reverse direction;

a three-position control valve in fluid connection between said source of hydraulic pressure and said hydraulic motors, the valve having a spring return center position in which fluid flow to said hydraulic motors is interrupted, a forward position in which fluid flows from said hydraulic pressure source through said motors to turn said augers in the forward direction, and a reverse position in which fluid flows from said hydraulic pressure source through said motors to turn said augers in the reverse direction; and means affixed to said cover to move said control valve to the forward position when the cover is closed and to permit the control valve to automatically return to the neutral position when the cover is opened, the valve having a hande such that when the cover is in the open position the valve may be manually moved to the forward or rearward position.

* * * * *